Jan. 1, 1924
J. L. BUTLER
RING COVERING APPARATUS
Filed Dec. 16, 1920
1,479,126
2 Sheets-Sheet 1
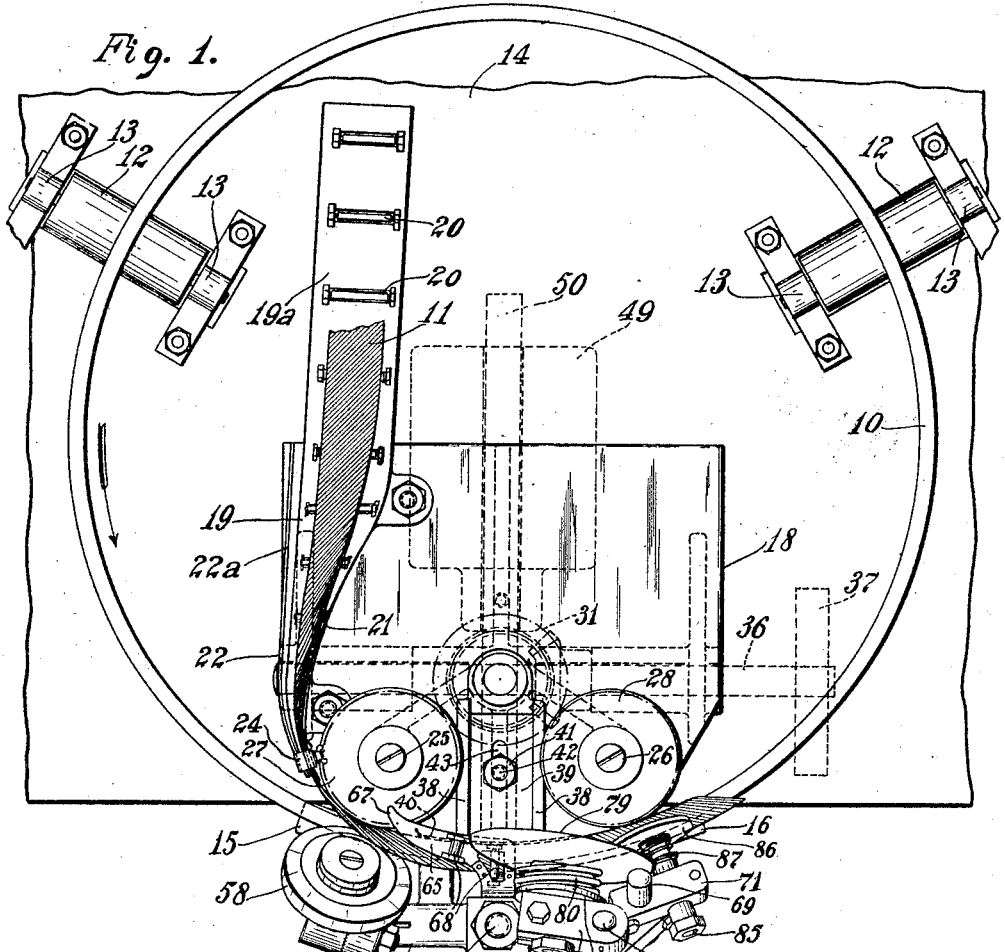
Fig. 1.
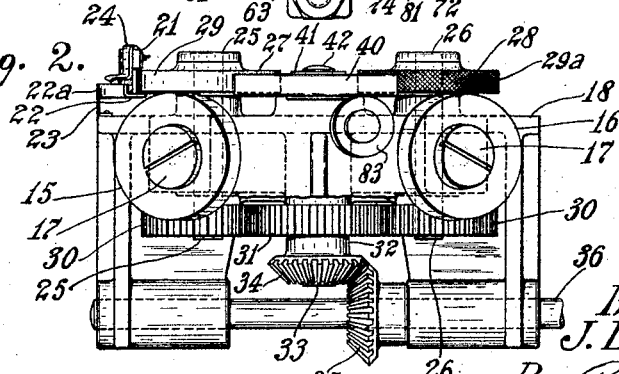
Fig. 2.
Inventor
J. L. Butler
By Robert M Pierson
Atty.

Jan. 1, 1924
J. L. BUTLER
RING COVERING APPARATUS
Filed Dec. 16, 1920
1,479,126
2 Sheets-Sheet 2
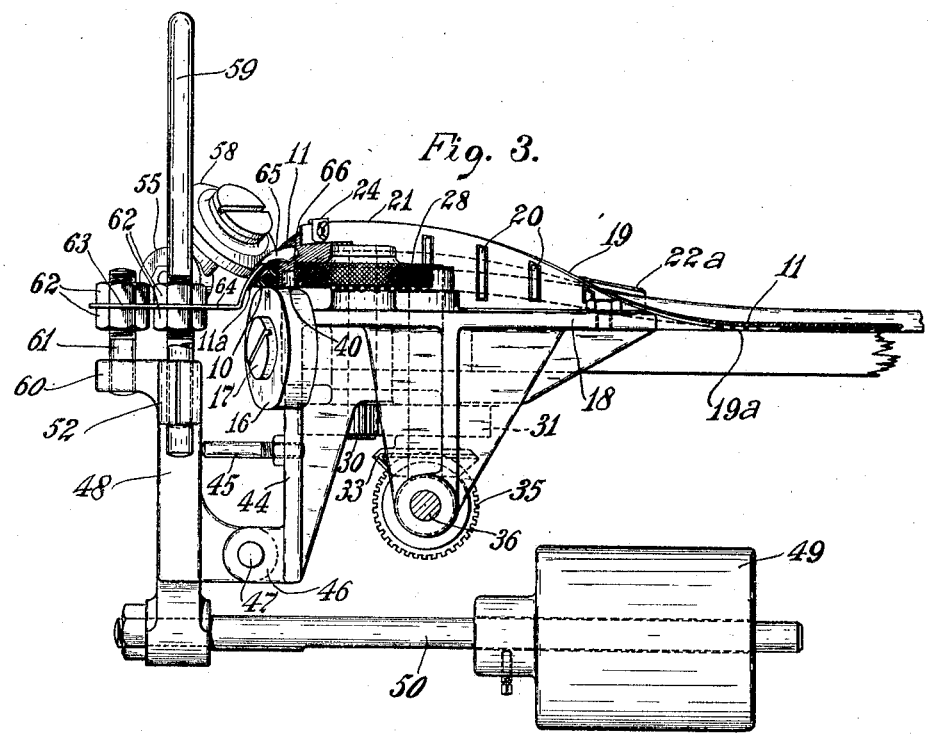
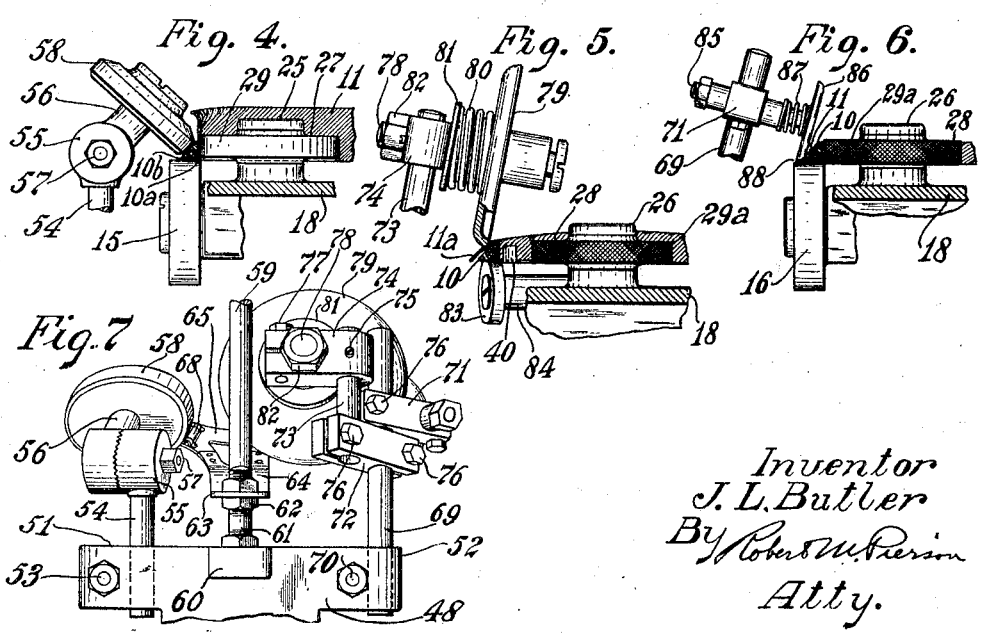
Inventor
J. L. Butler
By Robert M. Pierson
Atty.

Patented Jan. 1, 1924.

1,479,126

UNITED STATES PATENT OFFICE.

JAMES L. BUTLER, OF AKRON, OHIO, ASSIGNOR TO THE B. F. GOODRICH COMPANY, OF NEW YORK, N. Y., A CORPORATION OF NEW YORK.

RING-COVERING APPARATUS.

Application filed December 16, 1920. Serial No. 431,238.

*To all whom it may concern:*

Be it known that I, JAMES L. BUTLER, a citizen of the United States, residing at Akron, in the county of Summit and State of Ohio, have invented a certain new and useful Ring-Covering Apparatus, of which the following is a specification.

This invention relates to the art of applying a strip covering or partial covering to a ring, and more particularly to a ring having a polygonal cross-section, my invention being particularly adapted to apply to triangular bead core rings for pneumatic tire casings, so-called "tying" strips of rubberized cord or other fabric which usually enwrap the bead ring on two sides and serve as a connection between it and the tire fabric.

My principal objects are to provide means for accurately placing a strip in a predetermined position on a ring and for applying the strip more rapidly than has been possible with the means used heretofore.

Of the accompanying drawings:

Fig. 1 is a plan view of an apparatus embodying my invention, with the work in position to be operated upon.

Fig. 2 is a front elevation showing the ring-propelling mechanism and a part of the strip folding tools.

Fig. 3 is a side elevation of the apparatus with a part of the folding tools removed, showing the work in section.

Figs. 4, 5 and 6 are transverse sectional views illustrating the action of different parts of the apparatus on the work.

Fig. 7 is a front elevation showing certain of the strip-folding and shaping devices.

In these drawings 10 is a bead core ring for a pneumatic tire casing, the ring being triangular in cross-section, and 11 is a strip of rubberized fabric (in this instance cord fabric) whose width is sufficient to cover the approximately cylindrical inner surface and the conical outer surface of the ring and leave a free-edged marginal portion 11$^a$ (Fig. 5) on the outside of the latter. The strip is stretchable longitudinally to permit the working of the fabric onto the ring without wrinkling or gathering, and it is made by joining the ends of short lengths cut on a bias from a square-woven fabric such as is commonly used in tire carcasses, or from a sheet of rubberized cord fabric. The ring is supported in position to be operated on by two rollers 12, 12 loosely journaled in bearings 13 at the rear of a table 14, and two other rollers 15, 16 mounted to turn freely on stud shafts 17 fastened to the forward side of a bracket 18 which is attached to the front of the table. The strip 11 is held in position to be drawn horizontally onto the ring by a guide plate 19 having an anterior portion 19$^a$ in a horizontal plane, extending transversely of the table, and a posterior portion 21 in a vertical plane, the plate being twisted as shown, from the horizontal to the vertical plane, to bring the leading edge of the strip parallel to the cylindrical inner surface 10$^a$ of the ring, and having rollers 20 for reducing the drag on the strip. A bottom guide plate 22 (Figs. 1 and 2) supported on the bracket 18 by legs 23 maintains the lower edge of the leading end of the strip even with the top of the wheel 15. 24 is a vertically-adjustable top guard fastened to the upturned end of the plate 21, and projecting over the strip to prevent the latter from rising above the plate 22 as it is drawn onto the ring. A vertical guard flange 22$^a$ on the plate 22 holds the strip from running off the guide plate 19.

25, 26 are vertical driven shafts projecting above the bracket 18 and carrying on their upper ends horizontal driving wheels or rollers 27, 28 whose cylindrical outer surfaces 29, 29$^a$ engage the inner surface of the ring or the covering strip thereon to move the ring circumferentially. These wheels are rotated at the same angular speed and in the same direction by spur gears 30 on the lower end of the shafts 25, 26, these gears having the same number of teeth which mesh with the teeth of a common driving gear 31. The knurled periphery 29$^a$ of the right-hand (Fig. 1) ring-driving wheel 28 is preferably made slightly larger in circumference (about one thirty-second of an inch) than the smooth periphery 29 of the left-hand wheel 27, so that if slippage should occur between the surface of the wheel 28 and the ring or strip thereon, the wheel 27 will not move the ring and covering strip ahead faster than they are propelled by the other wheel and bend the ring or strip outwardly between the wheels. The gear 31 is carried on the upper end of a sleeve 32 rotatably mounted on a stud axle 33 projecting downwardly below the table, said sleeve carrying on its lower end a bevel gear 34 meshing with a similar gear 35 on a horizontal shaft 36 driven by a belt wheel 37.

On the upper side of bracket 18, between the wheels 27, 28, are formed a pair of parallel, rearwardly-extending gibs 38 holding a horizontal plate 39 whose forward end 40 is turned up at right angles to the table and is bent horizontally into an arc whose center is approximately at the center of the ring 10. A nut 41 on the upper end of a fixed bolt 42 which projects upwardly from the bracket 18 through a longitudinal slot 43 in the plate 39, holds the latter in adjusted position with its upturned curved end 40 bearing against the inner surface of the bead core or strip thereon, in order to prevent an inward bending of the ring between the driving wheels under pressure on the outer side of the ring.

44 (Fig. 3) is a fixed member projecting downwardly from the front portion of the bracket 18 and having, intermediate of its length, an adjustable, horizontal stop pin 45, and at its lower end a bearing 46 for a hinge pin 47. Pivotally mounted on this pin is a lever 48 normally held in a vertical position against the stop pin 45 by a weight 49 secured in adjusted position on a horizontal bar 50 extending under the table and attached at its outer end to the lever 48 at a point below its pivot. The vertical arm of this lever has horizontal members 51, 52, (see particularly Fig. 7) projecting laterally from the opposite sides thereof, whose ends are split and formed with vertical openings adapted to receive the shanks or posts of certain tool supports hereinafter referred to.

The lever handle is a rod 59 projecting above the top of the table where it may be readily grasped by the operator to swing the vertical arm of the lever outwardly away from the ring. In front of this rod and supported by a forwardly-projecting lug 60 on the lever is a short vertical rod 61. Nuts 62 threaded on these rods grip the shank 63 of a T-shaped guide 64 of the hemmer type, and hold the latter in a horizontal position with its operative portion or head 65 projecting over the bead ring. This guide is made of sheet metal and its head is bent upwardly over the bead ring to the inside thereof and then slightly in a downward direction to form an inner lip 66 (Fig. 3) whose lower edge lies above the ring to permit a free movement of the head transversely thereof when the lever 48 is swung outwardly on its pivot. The guide head 65 is also bent to conform generally to the curvature of the ring, and its anterior end 67 is turned upwardly and inwardly to receive the leading end of the strip 11 and turn it over between the guide and the bead ring when starting a strip onto the latter. Rollers 68 similar to the rollers 20 are carried at spaced points along the guide head 65 to reduce the drag of the latter on the tacky surface of the fabric.

Fastened in the outer end of the member 51 by a clamping bolt 53 is a vertical post 54, carrying on its upper end a toothed boss 55, to which the complementally toothed hub of a stud shaft 56 is secured in different angular positions relatively thereto by a bolt 57 passing through the boss and hub. 58 is an inclined presser wheel or roller mounted to turn freely on the shaft 56 and adapted to bear against the conical outer periphery $10^b$ (Fig. 4) of the ring to press the latter firmly against the vertical bottom roller 15 and the horizontal driving wheel 27 to hold the ring in position to be operated on and to press its inner surface against the strip 11 as the latter is fed onto the ring.

A vertical post 69 held in the split end of the bracket member 52 by a clamping bolt 70, supports two horizontal clamps or brackets 71, 72 of which the bracket 72 supports a shorter post 73 carrying an arm 74 fixedly secured in adjusted position thereon by a set screw 75. The brackets permit a vertical and horizontal angular adjustment of tools carried thereby relative to the posts and are held in their adjusted positions by bolts 76 which clamp the split ends of the brackets onto the posts. Fastened in the outer split end of the arm 74 by a clamping bolt 77 is a stud shaft 78 projecting over the ring in a position slightly inclined in advance of a radial position and supporting on its inner end a freely rotatable and axially slidable wiping disk-wheel 79 which is forced against the ring surface $10^b$ or the part of the covering strip thereon by a helical spring 80 surrounding the shaft between the wheel and a fixed plate 81. The tension of the spring is adjusted by turning a nut 82 on the outer end of the shaft to move the latter toward or from the ring. The diskwheel 79 is rotated by contact with the ring and has a downward and forward wiping action on the strip to work the latter over the conical ring surface $10^b$. That part of the ring on which this wheel operates rests on a small roller 83 mounted to turn freely on the end of a stud shaft 84 which is fixed at its inner end to the plate 18, the upturned end 40 of the plate 39 keeping this part of the ring from sliding inwardly over the roller under the pressure exerted by the spring 80.

The second bracket 71 on the post 69 carries the bearing for a freely rotatable and axially slidable shaft positioned at a downwardly inclined angle to the plane of the ring, the shaft 85 carrying on its inner end a disk-wheel 86, inclined at a small angle to the vertical, and being surrounded by a spring 87 which presses the lower edge of this wheel downwardly against the free edge-portion $11^a$ of the strip, forcing the latter against the top surface of the wheel 16, the two wheels progressively working the edge-portion 11ª into a radially projecting fin 88. The spring 87 also forces the disk-wheel 86 against the ring 10 holding this ring firmly against the driving wheel 28.

To operate the machine, the handle 59 is moved to the left as viewed in Fig. 3, to carry the tools on the lever 48 away from those on the bracket 18, a bead ring 10 is placed on the rollers 12 and 15, 16, and the handle is released, permitting the weight to return the laterally-movable tools to their operative positions. A strip of fabric is placed on the guide plate 19 and its leading end is passed over the plate 22 and under the guard 24 and pressed against the inner surface 10ª of the ring, the tacky surface of the strip causing the two to adhere. Power is then applied to rotate the ring-driving wheels 27, 28, move the ring circumferentially, feed the tying strip 11 longitudinally onto the inner side of the ring and move the two through the strip folding and shaping tools.

The plates 19, 22 and the guard 24 serve to guide the strip onto the ring, and the roller 58 presses the ring firmly against the lower portion of the strip, sticking the two together to prevent a lateral displacement of the fabric on the ring by the folding and wiping tools. The guide 64 folds the strip over the top of the ring and the wiping roller 79 progressively stretches it longitudinally and presses in on the outer ring surface 10ᵇ, while the small roller 86 rolls the free edge 11ª down flat on the roller 16, thus completing the shaping of the strip on the ring. When the ring is nearly covered, the operator stops the machine, severs the length of a fabric necessary to cover the top of the ring, from the strip on the guide plate 19, and butts the ends of the covering strip on the ring, the tacky unvulcanized rubber in the butted ends being united by the tools when the machine is again set in operation to finish the forming of the cover upon the ring.

The oblique position of the wiping roller 79, the outer periphery of which engages the work, results in a definite rubbing of the cover strip toward the outer periphery of the bead as the latter is propelled past the wheel, and this lateral rubbing or wiping action is in substantially the same direction at all contacted parts of the work, as distinguished from the curvilinear wiping action of a roller having a frusto-conical, cylindrical or plane working surface and journaled on an axis which is not oblique to the direction of movement of the work.

The guide 19, being adapted to twist the cover strip from a plane substantially parallel to that of the bead ring to a plane perpendicular thereto, permits the cover strip to be readily brought into alignment with the ring, in the space surrounded by the latter, without flexing it edgewise. Said guide also is adapted accurately to introduce to the bead the relatively fragile or distortable cord fabric which is sometimes used as a covering strip, without unduly distorting or injuring the fabric.

I claim:

1. In an apparatus of the class described, the combination of means for supporting a ring in a horizontal position, means for circumferentially propelling the ring, a guide structure adapted to twist a strip of covering material from a horizontal to a vertical plane and guide it longitudinally onto the inner side of the ring with the lower edge of the strip in a predetermined position relative to the lower side of the ring, and means for folding the free upper edge of the strip outwardly over the ring.

2. In a ring covering apparatus the combination of means for supporting and circumferentially driving a ring, guiding means in the space surrounded by the ring adapted to hold a flat covering strip in parallel relation with the plane of the ring and to twist it from such position so as to guide it flat-wise onto the inner face of the ring.

3. In a ring-covering apparatus, the combination of means for moving a ring circumferentially, means for guiding a covering strip onto the inner side of the ring, means for folding the strip outwardly over the latter, and means including a rotary pressing member journaled on an axis oblique to the direction of travel of the adjacent part of the work, so as to rub the covering strip toward the outer periphery of the work, for working the strip against the outer side of the ring.

4. In a ring-covering apparatus, the combination of a feeding wheel on the inner side of a ring to propel the latter circumferentially, releasable means for pressing the ring against the wheel, means for guiding a covering strip longitudinally between the wheel and ring, guiding means for giving the strip a trough shape over a side of the ring, and a rotary presser member adapted to engage the work on its outermost surface and so obliquely positioned as to rub the cover strip toward the outer periphery of the ring as the latter is propelled past said presser member, by reason of the angular relation of its axis to the work, for progressively working the strip against the outer side of the ring.

5. In a ring-covering apparatus, the combination of means for supporting a ring, means on the inner side of the ring to propel the latter circumferentially, means for guiding a covering strip longitudinally onto the ring, strip folding mechanism on the outer side of the ring movable transversely of the axis thereof toward and from its operative position, and supporting means for said mechanism normally holding the latter in its operative position and pressing the ring against the propelling means.

6. In a ring covering apparatus, the combination of means for propelling a ring circumferentially and comprising circumferentially spaced driven wheels having different peripheral speeds, means for pressing the ring against the peripheries of the wheels, means for guiding a covering strip longitudinally onto the ring, and means for folding the strip transversely over the latter.

7. In a ring-covering apparatus, the combination of rotatable ring-propelling wheels on the inner side of a ring and substantially in the plane thereof, said wheels having different peripheral speeds, means for pressing the ring against the wheels, means for guiding a covering strip longitudinally onto the inner side of the ring between the latter and the wheel having the lowest peripheral speed, and means for folding the strip transversely over the ring.

8. In a ring-covering apparatus, the combination of means for supporting and propelling a ring circumferentially including ring driving wheels and a radially fixed member adapted to lie on the inner side of the ring and prevent an inward bending of a portion thereof under pressure on the outer side of the latter, a support on the outer side of the ring adapted to be moved toward or away from the said supporting and propelling means, means for guiding a covering strip longitudinally onto the ring, and means carried by said support to fold the strip transversely over the ring and press the latter against the propelling means and fixed member.

9. In a ring-covering apparatus, the combination of a driven wheel on the inner side of the ring, a radially fixed member on the inner side of the ring preventing an inward bending of the latter under pressure from the outer side thereof, means for guiding a covering strip longitudinally onto the inner side of the ring, and releasable means, including a strip guide and a forward wiping roller, acting on the outer side of the ring opposite the fixed member to fold the strip transversely over the ring and roll it down onto the latter.

In witness whereof I have hereunto set my hand this 14th day of December, 1920.

JAMES L. BUTLER.